US009689506B2

(12) United States Patent
Homma et al.

(10) Patent No.: US 9,689,506 B2
(45) Date of Patent: Jun. 27, 2017

(54) HOLLOW POPPET VALVE

(71) Applicant: NITTAN VALVE CO., LTD., Hadano-shi, Kanagawa (JP)

(72) Inventors: Koichi Homma, Hadano (JP); Hiroki Onuma, Hadano (JP); Jin Hasegawa, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 113 days.

(21) Appl. No.: 14/431,657

(22) PCT Filed: Mar. 26, 2013

(86) PCT No.: PCT/JP2013/058883
§ 371 (c)(1),
(2) Date: Mar. 26, 2015

(87) PCT Pub. No.: WO2014/054302
PCT Pub. Date: Apr. 10, 2014

(65) Prior Publication Data
US 2015/0240675 A1   Aug. 27, 2015

(30) Foreign Application Priority Data

Oct. 2, 2012  (WO) .................. PCT/JP2012/075452

(51) Int. Cl.
*F01P 1/08* (2006.01)
*F01P 1/06* (2006.01)
(Continued)

(52) U.S. Cl.
CPC .............. *F16K 49/007* (2013.01); *F01L 3/14* (2013.01); *F01L 3/16* (2013.01); *F01L 3/20* (2013.01);
(Continued)

(58) Field of Classification Search
CPC ....... F01L 3/16; F01L 3/20; F01L 3/18; F16K 1/32; F16K 49/007; F16K 1/12; F01P 3/14
(Continued)

(56) References Cited

U.S. PATENT DOCUMENTS 1,914,340 A * 6/1933 Holzwarth .............. F02C 7/232
                                                    123/41.41
2,369,063 A * 2/1945 McDill ..................... F01L 3/02
                                                    123/188.3
(Continued)

FOREIGN PATENT DOCUMENTS

DE          718717 C      3/1942
DE       2240572 A1       2/1974
(Continued)

OTHER PUBLICATIONS

International Search Report dated May 7, 2013 issued in corresponding application No. PCT/JP2013/058883.
(Continued)

*Primary Examiner* — Carlos A Rivera
*Assistant Examiner* — Syed O Hasan
(74) *Attorney, Agent, or Firm* — Westerman, Hattori, Daniels & Adrian, LLP

(57) ABSTRACT

A hollow poppet valve (10) is provided with an additional flange shape cavity (S1a), in addition to an ordinary valve head cavity (S1) formed in the valve head (14) of the valve (10) in communication with a valve stem cavity (S2) formed in a valve stem (12). A coolant (19) is loaded in the cavities to facilitate dissipation of heat out of the valve. This flange shape cavity (S1a) extends radially outwardly round a bottom portion of the valve head cavity (S1), extending close to a valve seat, thereby significantly facilitating heat transfer between the coolant (19) and the valve seat of the
(Continued)

valve, yet, since the flange shape cavity (S1a) does not influences the thickness of other regions of the valve, it does not degrade durability of the valve.

9 Claims, 7 Drawing Sheets

(51) Int. Cl.
    *F01L 3/00*     (2006.01)
    *F16K 49/00*     (2006.01)
    *F01L 3/14*     (2006.01)
    *F01L 3/16*     (2006.01)
    *F16K 1/12*     (2006.01)
    *F01L 3/20*     (2006.01)
    *F16K 1/32*     (2006.01)
    *B21K 1/22*     (2006.01)
    *B23P 15/00*     (2006.01)

(52) U.S. Cl.
    CPC .................. *F16K 1/12* (2013.01); *F16K 1/32* (2013.01); *B21K 1/22* (2013.01); *B23P 15/002* (2013.01); *Y10T 137/6579* (2015.04)

(58) Field of Classification Search
    USPC ...................... 123/41.34, 41.41, 188.2, 90.1, 123/90.11–90.67; 137/340
    See application file for complete search history.

(56) References Cited

U.S. PATENT DOCUMENTS

| 3,313,277 | A | * | 4/1967 | Adolfsson | ................ | F01L 3/18 |
|---|---|---|---|---|---|---|
| | | | | | | 123/188.9 |
| 2004/0261746 | A1 | | 12/2004 | Narasimhan et al. | | |
| 2011/0186000 | A1 | | 8/2011 | Endo | | |
| 2012/0255175 | A1 | | 10/2012 | Morii et al. | | |
| 2014/0352803 | A1 | | 12/2014 | Onuma et al. | | |

FOREIGN PATENT DOCUMENTS

| DE | 27 27 006 A1 | 12/1978 |
|---|---|---|
| JP | 60-87314 U | 6/1985 |
| JP | 61-106677 U | 7/1986 |
| JP | 62-62071 A | 3/1987 |
| JP | 4-76907 U | 7/1992 |
| JP | 2004-301124 A | 10/2004 |
| JP | 2011-179328 A | 9/2011 |
| WO | 2010/041337 A1 | 4/2010 |
| WO | 2014/054113 A1 | 4/2014 |

OTHER PUBLICATIONS

Extended European Search Report dated Jun. 24, 2016, issued in counterpart application No. 13843227.3. (6 pages).

* cited by examiner (a)

(b)

(a)

(b)

HOLLOW POPPET VALVE

TECHNICAL FIELD OF THE INVENTION

This invention relates to a hollow poppet valve comprising an internal cavity extending from within a valve head into a valve stem and charged with a coolant, and more particularly to a hollow poppet valve comprising a diametrically large cavity formed in a valve head (the cavity hereinafter referred to as valve head cavity) communicated with a diametrically small cavity formed in a valve stem (the cavity hereinafter referred to as valve stem cavity).

BACKGROUND ART OF THE INVENTION

Patent Documents 1 and 2 listed below disclose hollow poppet valves comprising a valve head integrally formed at one end of a valve stem, the poppet valve formed with an internal cavity that extends from within a valve head into the valve stem and is charged with a coolant together with an inner gas, the coolant having a higher heat conductivity than the valve material. An example of such coolant is metallic sodium, which has a melting point of about 98° C.

Since this type of internal cavity extends from within the valve head into the stem and contains a large amount of coolant, it can advantageously enhance the heat transferability (hereinafter referred to as heat reduction property) of the valve.

If the temperature of a combustion chamber of the engine is heated to an excessively high temperature during an operation, knocking may take place, which lowers the fuel efficiency, and hence the power, of the engine. In order to lower the temperature of the combustion chamber, there has been proposed different types of coolant-charged poppet valve, which is provided with an internal cavity for example filled with a coolant together with an inert gas so as to positively enhance the heat transfer property of the valve.

Conventional internal poppet valves (as disclosed in Patent Documents 1 and 2) comprise a generally disk shape valve head cavity in the valve head and a linear valve stem cavity in the valve stem in communication with the valve head cavity via a smooth interconnect region (that is, a region having a gradually changing inner diameter), so that a coolant charged in the valve head cavity as well as the valve stem cavity and the inert gas can move smoothly between the two cavities, thereby supposedly facilitating an anticipated heat reduction property of the valves.

With this smooth interconnect region, the (liquefied) coolant can move smoothly between the two cavities in response to a valve opening/closing motion of the valve. However, the interconnect region allows upper, middle, and lower layers of the coolant to move in the axial direction of the internal cavity without intermixing the layers.

Consequently, thermal energy stored in lower layers of the coolant (near a heat source) is not positively transferred to middle and upper layers of the coolant, so that the heat reduction property of the valve is not fully fulfilled.

In order to improve the heat reduction property of such hollow poppet valve, Patent Document 3 proposes an improved hollow poppet valve which comprises a diametrically small linear valve stem cavity (formed in a valve stem) connected at a substantially right angle to the circular ceiling of a generally truncated circular cone shape valve head cavity (formed in a valve head) so that, in response to a reciprocal motion of the valve, a smooth flow of coolant is prohibited between the two cavities but instead flows of coolant towards the ceiling past the periphery of the valve head cavity are generated in the valve head cavity, thereby generating vertical circulatory flows of coolant along the axis of the valve (the circulatory flows hereinafter referred to as tumble flows) in the valve head cavity that facilitates positive stirring of the coolant in the valve head cavity and enhances the heat reduction property of the valve (exhibiting a good heat conduction).

PRIOR ART DOCUMENTS

Patent Documents

Patent Document 1: WO2010/041337
Patent Document 2: JPA Laid Open 2011-179328
Patent Document 3: PCT/JP2012/075452 (Filed on Oct. 2, 2012)

SUMMARY OF THE INVENTION

Objects to be Achieved by the Invention

One way to further improve the heat reduction property of a hollow poppet valve of Reference 3 is to increase the capacity of the internal cavity for storing a coolant by reducing the thickness of the wall of the valve. The thickness of the wall, however, cannot be reduced indefinitely from the viewpoint of securing durability of the valve.

Although a valve head is heated to a high temperature as it is exposed to a high temperature exhaust gas in the combustion chamber and/or in an exhaust port, the heat is dissipated from the valve by the coolant loaded in the internal cavity or by a valve guide in contact with the valve stem. It is believed that most of the heat energy in the valve head is dissipated to a cylinder via a valve seat insert in contact with the valve.

Therefore, in order to enhance the heat reduction property of the valve, it is important above all to make its valve head capable of efficiently transferring heat to a valve seat insert. To do so, it is preferable to shorten material length of heat transfer channel between the coolant in the internal cavity and the valve seat of the valve. As a possible measure, one might think of enlarging the entire valve head cavity. In actuality, however, it is hardly possible to do so since an excessive enlargement of the valve head cavity entails impermissible risk of thinning and weakening the valve head too much so that the valve head cannot maintain its heat resistance any longer.

Instead, the inventors of the present invention have explored an approach to enlarge a bottom fringe portion of the valve head cavity radially outwardly, by deforming the portion into a flange shape cavity to reduce the material length of heat transfer channel between the coolant in the valve head cavity and the valve face and enhance heat transfer efficiency (and hence heat reduction property of the valve), without losing durability of the valve head.

It is noted that an idea of enlarging the bottom portion of the valve head cavity into a flange shape cavity is shown in, for example, FIGS. 1 and 3 of the Patent Document 3. In Reference 3, this flange shape enlargement of the valve head cavity is meant to be a structural improvement for generating tumble flows in a coolant in a generally truncated circular cone shaped valve head cavity in communication with a valve stem cavity during a reciprocal motion of the valve. However, the present inventors have recognized that the merits of this flange shape enlargement of the valve head cavity is not limited to the one as disclosed in the Patent Document 3, but rather it can be pursued and enjoyed in other types of poppet valves including those disclosed in the Patent Document 1 and 2. Therefore, the present inventors apply for and pursue an application for patent regarding this feature of a poppet valve, claiming a priority based on the Patent Document 3.

Thus, in view of the foregoing knowledge of the present inventors, it is an object of the present invention to provide a hollow poppet valve having a valve head cavity with its bottom portion extended radially outwardly so as to enhance the heat reduction property (or heat transferability) of the valve.

In order to achieve the object above, there is provided, 5 in accordance with one aspect of the invention as recited in claim 1, a hollow poppet valve comprising a valve head and a valve stem integral at one end thereof with the valve head, the poppet valve formed with an internal cavity that extends from within the valve head into the valve stem and is charged with a coolant together with an inert gas, wherein the internal cavity has a diametrically large generally disk shaped cavity formed in the valve head and a diametrically small linear straight cavity formed in the valve stem in communication with the valve head cavity, and wherein a bottom fringe portion of the valve head cavity is extended radially outwardly to form a flange shape cavity.

(Function) Most of the heat energy stored in the valve head is transferred to the host material (that is, a wall of the valve head cavity) by the coolant. The heat is then transmitted from a valve seat of the valve to a cylinder head. Firstly, since the bottom fringe portion of the valve head cavity is extended radially outwardly, the amount of the coolant in the valve head cavity is increased, thereby facilitating heat transfer efficiency of the valve head.

Secondly, since the length of heat transfer channel in the valve material between the coolant and the valve seat is reduced by an incremental radial length of the bottom fringe portion of the valve head cavity, the heat transfer efficiency of the valve head is improved.

It is noted that since only the bottom fringe portion of the valve head cavity is deformed into a flange shape cavity, without thinning the entire wall of the valve head, there is no risk of losing rigidity of the valve head.

In the hollow poppet valve defined in Claim 1, the valve head cavity may be configured in the shape of a generally truncated circular cone having a tapered periphery in parallel with the outer periphery of the valve head and a circular ceiling perpendicular to, and in communication with, the valve stem cavity at a right angle, whereby a vertical circulatory flow of coolant along the axis of the valve is generated during a reciprocal motion of the valve, as recited in Claim 2.

(Function) When the valve is in a downward valve-opening motion, the coolant is subjected to an upward inertial force as shown in FIG. 3(a). Since the (upward) inertial force then acting on the coolant is larger in the central region of the valve head cavity than in the surrounding region, the coolant in the central region is urged to move into the valve stem cavity across the interconnect region between the valve head cavity and the valve stem cavity. However, since the upper end surface of the valve head cavity (or the peripheral region round the open end of the valve stem cavity) is a planar face substantially perpendicularly to the axis of the poppet valve (to form an eave-shape annular step in the interconnect region), the coolant cannot smoothly flow into the valve stem cavity as in a conventional hollow poppet valve (as disclosed in Patent Documents 1 and 2).

Consequently, radially outward flows F1 of coolant are generated along the annular step (or the ceiling of the valve head cavity), in addition to minor flows F4 and F5 across the interconnect region P into the valve stem cavity S2, as shown in FIG. 4(a). At the same time, the pressure in the central region of the valve head cavity becomes negative near the bottom of the valve head cavity due to upward movement of the central coolant, generating radially inward flows F3, which flows in turn generate downward flows F2 along the inclined conic periphery of the valve head cavity.

In this way, vertical outer perimetric circulatory flows of coolant (hereinafter referred to as outer perimetric tumble flows) are generated in the valve head cavity as indicated by a sequence of arrows F1, F2, and F3 and F1, while turbulent flows occur in the valve stem cavity as shown by arrows F4 and F5.

On the other hand, when the valve is in an upward valve-closing motion, the coolant is subjected to a downward inertial force as shown in FIG. 3(b). Since in this case the downward inertial force acting on the coolant in the central region of the valve head cavity is larger than that acting on the coolant in the peripheral region, radially outward flows F6 are generated along the bottom of the valve head cavity as shown in FIG. 4(b). At the same time, a downward turbulent flow F7 is generated in the valve stem cavity and across the interconnect region. These flows F6 along the bottom of the valve head cavity are eventually turned into generally upward flows F8 towards the ceiling of the valve head cavity S1 and merges into the central flows F6 and F7.

In other words, as indicated by a sequence of arrows F6, F8, and F6, inner perimetric circulatory flow of coolant (referred to as inner perimetric tumble flow) is generated in the valve head cavity along the axis of the valve and so is a turbulent flow in the valve stem cavity as indicated by arrow F7.

In this way, in association with an upward/downward motion of the valve, circulatory flows of coolant that involve turbulence are generated in the entire internal cavity as shown in FIG. 4, which actively stir upper, middle, and lower layers of coolant in the internal cavity and significantly improves the heat reduction property (heat transferability) of the valve.

In the hollow poppet valve defined in Claim 2, the ceiling of the radially extended bottom fringe portion of the valve head cavity may be tapered so as to allow a part of tumble flows to be lead into the bottom fringe portion of the valve head cavity, as recited in Claim 3.

(Function) In response to a reciprocal motion of the valve, a part of a tumble flows of coolant generated in the valve head cavity can be led to the bottom fringe portion of the valve head cavity, facilitating stirring of the coolant therein to further improve the heat reduction property (heat transferability) of the valve.

In the hollow poppet valve defined in Claim 2 or 3, valve the valve head cavity may be configured to have a circular ceiling offset from the top end of the generally truncated circular cone by a predetermined distance towards the stem to provide a generally truncated circular cone shape valve head cavity having a stepped ceiling, as recited in Claim 4.

(Function) Since the valve head cavity of the valve head defined in Claim 2 or 3 is a generally truncated circular cone in shape and has a circular flat ceiling, a die having a flat pressing face may be used to forge such valve head. Such die can be prepared in a much easier way as compared with conventional dies for forging curved faces and tapered faces.

However, it is difficult to accurately form such flat circular ceiling (upper end face of a generally truncated circular cone cavity) only by forging. Besides, the pressing face of the die for forming the flat ceiling can be quickly worn out.

However, a valve head cavity defined in Claim 4 has a stepped flat ceiling offset from the upper end of the generally truncated circular cone cavity towards the stem by a predetermined distance. In this case, such circular ceiling may be obtained by machining a semi-spherical bottom surface of a recess of a forged valve head a predetermined depth to form a flat circular face perpendicular to the axis of the valve. In this approach, therefore, the die may suffice to have a less wearing and less accurate round pressing tip to form a circular ceiling, since such circular ceiling may be easily and accurately flattened by later machining.

The hollow poppet valve recited in any one of Claims 1 through 4 may be configured such that the valve stem cavity has a diametrically larger portion near the end of the stem (the portion hereinafter referred to as stem-end side stem cavity) and a diametrically smaller portion near the valve head (the portion hereinafter referred to as valve-head side stem cavity), and an annular step formed at the boundary of the two portions. The annular step is provided at a predetermined axial position of the valve stem cavity. The internal cavity may be partially filled with a coolant to a level exceeding the annular step.

(Function) When an upward valve-closing motion is changed to a downward valve-opening motion, the coolant in the valve stem cavity is moved from the diametrically small valve-head side cavity towards the diametrically large stem-end side stem cavity, resulting in a turbulent flow F9 of coolant downstream of the step as shown in FIG. 4(a), thereby stirring the coolant in the valve stem cavity.

On the other hand, when a downward valve-opening motion of the valve is changed to an upward valve-closing motion, the coolant once driven upward in the valve stem cavity is now driven downward from the stem-end side stem cavity to the valve-head side stem cavity. As a result, turbulent flows F10 are generated in the valve stem cavity downstream of the annular step, as shown in FIG. 4(b).

In this way, in response to a reciprocal motion of the valve, the coolant is moved in either axial direction of the valve stem cavity, generating turbulence in the neighborhood of the step, which stirs the coolant in the valve stem cavity, thereby enhancing the heat reduction property (or heat transferability) of the valve stem.

The step to be formed in the valve stem in accord with Claim 5 may be located at a position offset away from the entrance of the exhaust/intake port when the valve is installed in the exhaust/intake port, as recited in Claim 6.

(Function) Since fatigue strength of a metal becomes lower at higher temperatures, it is necessary for the stem-end side stem cavity of the valve stem to be of a sufficient thickness so as to withstand high temperatures of the exhaust/intake gas. On the other hand, a stem-end side region of the valve stem will never be heated to a high temperature like a valve-head side region of the valve stem, since the former region is remote from the combustion chamber and always remains in contact with a valve guide, so that the heat is promptly dissipated from the stem-end side region to the cylinder head via the valve guide. Thus, if the inner diameter of the stem-end side stem cavity is increased by reducing the thickness of the stem-end side valve stem, the valve stem will maintain its fatigue strength against heat and will not suffer fatigue failure.

Further, if the inner diameter of the stem-end side stem cavity is increased, the total surface area of the valve stem cavity (in contact with the coolant) is increased, so that the heat transfer efficiency of the valve stem is increased while reducing the entire weight of the valve. Still further, an incremented coolant enhances the heat reduction property (heat transferability) of the valve stem. The closer to the valve head the annular step is, the higher is the heat reduction property of the valve.

For this reason, it is preferable to provide the step 17 at a suitable axial position, at least not inside the exhaust/intake port (e.g. a position inside the valve guide, facing the exhaust/intake port) when the valve is fully opened.

Results of the Invention

According to the invention (as recited in Claim 1), the amount of the coolant loaded in the valve head cavity is increased and heat transfer channel established in the valve material between (the coolant loaded in) the valve head cavity, and material length of heat transfer channel between the coolant in the internal cavity and the valve seat of the valve is shortened, thereby enhancing the heat transfer efficiency of the valve head and hence improving the heat reduction property (heat transferability) of the valve. Moreover, performance of the engine is improved.

Although the wall of the valve head is partially thinned near the valve seat, rigidity nor bending strength of the valve head is not degraded, since the valve head is not entirely thinned.

According to the invention as recited in Claim 2, a vertical circulatory flow of coolant is generated along the axis of the valve during a reciprocal motion of the valve, so that upper, middle, and lower layers of coolant in the internal cavity are positively stirred, promoting heat transfer by the coolant in the entire internal cavity, which significantly improves the heat reduction property (heat transferability) of the valve.

According to the invention as recited in Claim 3, a vertical circulatory flow of coolant is generated in the valve head along the axis of the valve during a reciprocal motion of the valve in such a way that upper, middle, and lower layers of coolant in the internal cavity are stirred more positively to further promote heat transfer function of the coolant in the entire internal cavity, which improves the heat reduction property (heat transferability) of the valve more significantly.

According to the invention as recited in Claim 4, a certain level of machining accuracy is guaranteed in the manufacture of hollow poppet valves having a uniform heat reduction property (heat transferability).

According to the invention as recited in Claim 5, the entire coolant loaded in the valve stem cavity is positively stirred in response to a reciprocal motion of the valve in operation, thereby further enhancing the heat reduction property of the valve.

According to the invention as recited in Claim 6, the inner diameter of the stem-end side stem cavity may be increased and at the same time the step may be provided at an axially lower position in the valve stem cavity, thereby further improving the heat reduction property of the valve stem and reducing the total weight of the valve without influencing the durability of the valve. Thus, engine performance is further improved.

BRIEF DESCRIPTION OF THE DRAWINGS

FIG. 3(a) shows an inertial force that acts on the coolant in a hollow poppet valve moving (downward), and FIG. 3(b) an inertial force that acts on the coolant in a hollow poppet valve moving upward.

FIG. 4(a) shows a movement of the coolant when a downward valve opening motion of the valve is changed to an upward valve closing motion, and (FIG. 4(b) a movement of the coolant when an upward valve closing motion of the valve is changed to a downward valve opening motion.

FIG. 5(a) shows a step of hot forging an intermediate valve product in the form of a valve shell; FIG. 5(b), a step of forming an inner periphery adapted to engage with a cap and an annular step at an open end of a recess of the valve head shell of the valve shell, and a step of machining a semi-spherical bottom surface of the valve head shell to form a circular flat face; FIG. 5(c), a step of drilling a recessed bottom of the valve head shell to form a hole that corresponds to a stem-end side stem cavity of the valve stem cavity; FIG. 5(d), a step of drilling the valve stem to form a hole that corresponds to a stem-end side stem cavity; FIG. 5(e), a step of welding a stem member; FIG. 5(f), a step of depositing a coolant in the valve stem cavity; and FIG. 5(g), a step of welding a cap onto an open end of the recess of the valve head shell.

BEST MODE FOR CARRYING OUT THE INVENTION

Figure 1:
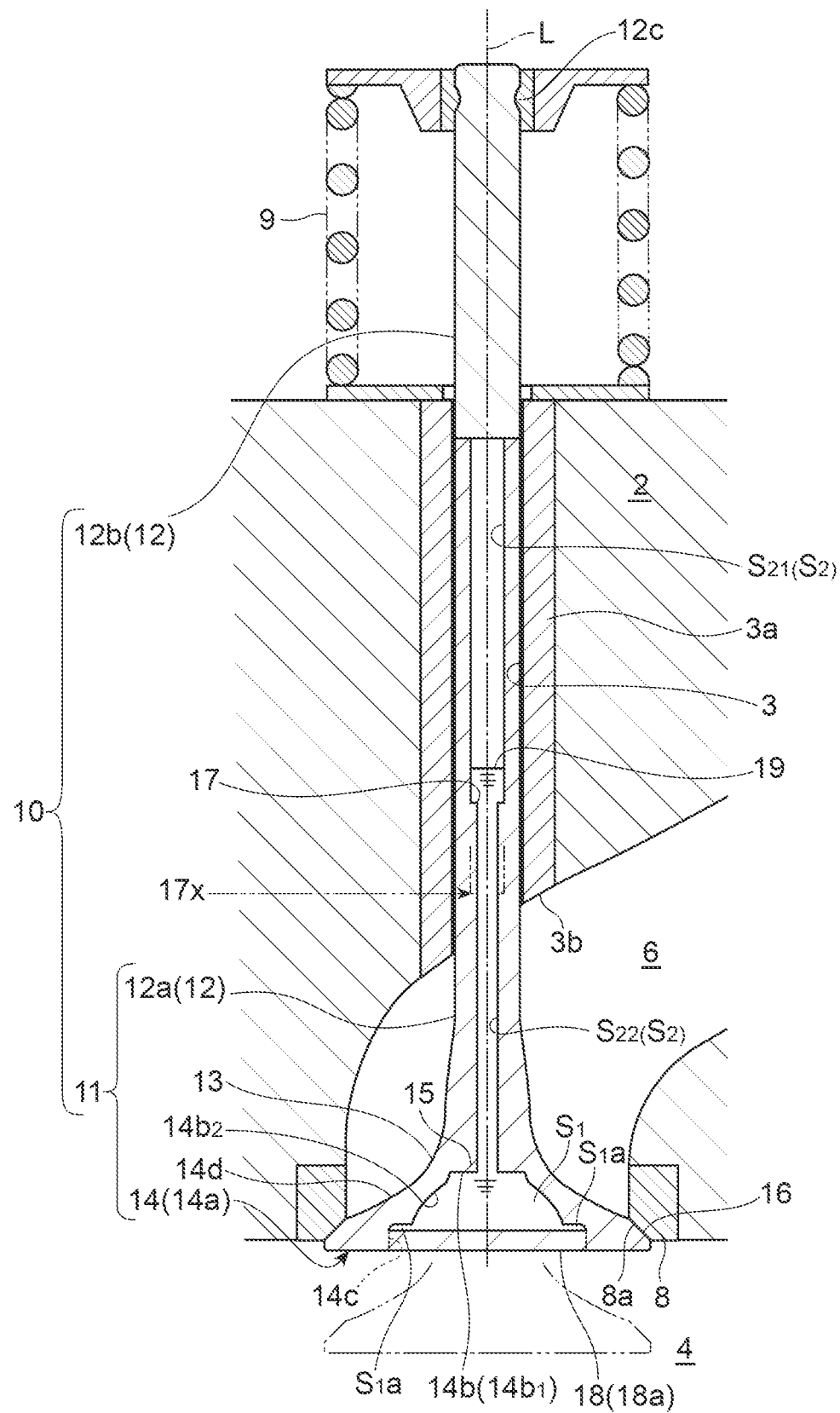
FIG. 1 is a longitudinal cross section of a hollow poppet valve in accordance with a first embodiment of the invention.

The present invention will now be described in detail by way of example with reference to a few embodiments.

Referring to FIGS. 1 through 5, there is shown a hollow poppet valve for an internal combustion engine, in accordance with a first embodiment of the invention.

In these figures, reference numeral 10 indicates a hollow poppet valve made of a heat resisting metal. The valve 10 has a straight valve stem 12 and a valve head 14 integrated with the valve stem 12 via a curved fillet 13 that has an increasing outer diameter. Provided in the peripheral region of the valve head 14 is a tapered seat 16 (also referred to as valve seat 16).

Specifically, an intermediate valve product 11 (hereinafter simply referred to as shell 11) comprises a generally cylindrical stem 12a and a valve head shell 14a integrally formed at one end of the stem 12a. A stem member 12b is welded to another end of the stem 12a, and a disk shape cap 18 is welded onto an inner periphery 14c of a generally truncated circular cone shape recess 14b of the valve head shell 14a to form a hollow poppet valve 10. The hollow poppet valve 10 is provided with an internal hollow space S that extends from within the valve head 14 into the valve stem 12. The hollow space S is charged with a coolant 19, such as metallic sodium, together with an inert gas such as argon.

Although it is true that the more the amount of coolant is loaded in the internal cavity S, the greater its heat reduction property is, the heat reduction property will not increase with the amount of the coolant loaded above a certain level, only to increase its cost. Thus, it is preferred from the point of cost-effectiveness (cost/mass ratio of the coolant loaded) to charge the internal cavity S with a coolant of about 1/2 to 4/5 in volume of the cavity S.

As shown in FIG. 1, a cylinder head 2 of the engine has an exhaust gas passage 6 which extends from a combustion chamber 4. An annular valve seat insert 8 is provided round the entrance of the exhaust gas passage 6 and has a tapered face 8a such that the tapered valve seat 16 of the valve 10 can be seated thereon. There is provided in the cylinder head 2 a valve insertion hole 3. Provided on the inner periphery of the valve insertion hole 3 is a valve guide 3a for slidably receiving the valve stem 12. The hollow poppet valve 10 is urged by a valve spring 9 to close the valve. A keeper groove 12c is formed at one end of the valve stem.

The internal cavity S consists of a diametrically large valve head cavity S1 formed in the valve head (the cavity hereinafter referred to as valve stem cavity S1) and a diametrically small linear cavity formed in the valve stem 12 (the cavity hereinafter referred to as valve stem cavity S2). The valve stem cavity S2 is perpendicular to, and communicates with, the valve head cavity S1. Formed at the bottom of the valve head cavity S1 is a bottom fringe portion of the valve head cavity in the form of a flange shape cavity S1a extending radially outwardly along the valve face 18a. That is, the generally truncated circular cone shape recess 14b of the valve head shell 14a is provided near an open end thereof with a threaded inner periphery 14c adapted to engage with the cap 18 and with an annular step 14b3 which is substantially perpendicular to the inner periphery 14c, in such a way that the inner periphery 14c, the annular step 14b3, and a backside of the cap 18 together constitute the flange shape cavity S1a at the bottom fringe portion of the valve head cavity S1. The flange shape cavity S1a communicates with the bottom of the valve head cavity S1.

As a result, firstly, the valve head cavity S1 is increased in volume by the volume of the flange shape cavity S1a, so that the amount of coolant 19 loaded in the valve head cavity S1 is increased accordingly, thereby improving the heat transfer efficiency of the valve head 14.

Secondly, the distance of heat transfer path in the valve material between the wall 14a of the valve head cavity S1 in contact with the coolant 19 and the valve seat 16 is shortened by the width W of the flange shape cavity S1a, thereby improving the heat transfer efficiency of the valve head 14.

It should be noted that the flange shape cavity S1a has a generally flat shape, so that it does not reduce the entire thickness of the wall of the valve head 14a nor lower rigidity or bending strength of the valve head 14.

Figure 2:
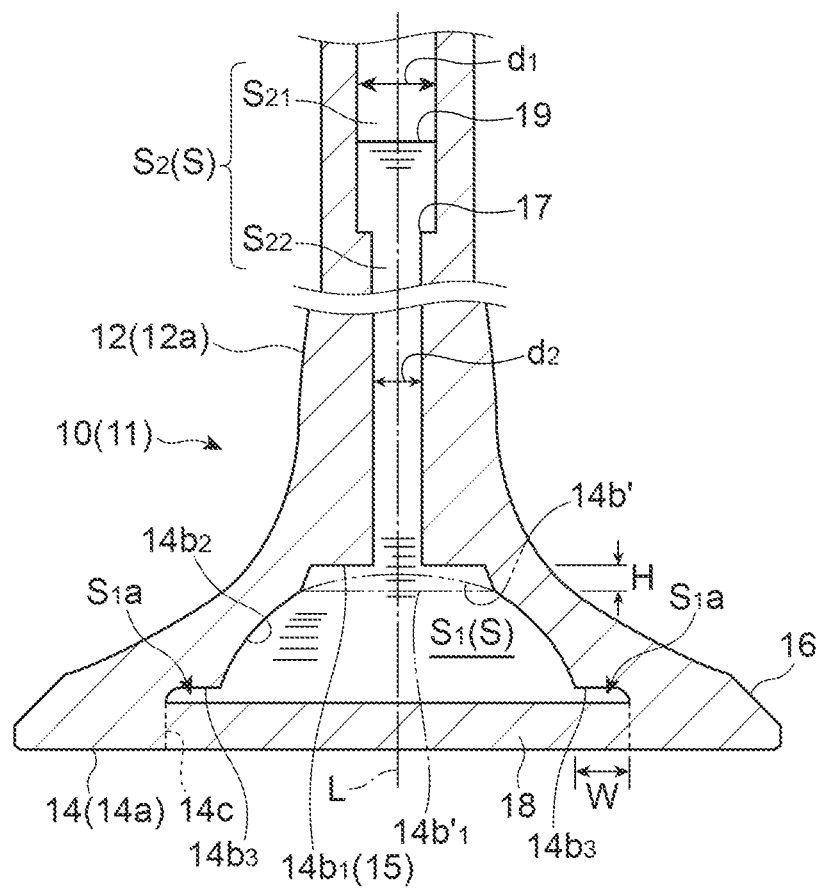
FIG. 2 is a longitudinal cross section of a relevant portion of the hollow poppet valve.

It should be also noted that the circular ceiling 14b1 of the generally truncated circular cone-shape valve head cavity S1 (or the circular bottom of the generally truncated circular cone-shape recess 14b) in communication with the linear straight valve stem cavity S2 of the valve stem 12 is a planar face perpendicular to the axis of the valve 10, as shown in FIG. 2.

Specifically, the valve head cavity S1 has a skirt-shape inclined outer periphery 14b2 which slightly bulges radially outwardly in longitudinal cross section. A circular ceiling 14b1 of the valve head cavity S1 is offset upward by a predetermined distance H from the position of the ceiling (or upper end) 14b'1 of the defined by the upper rim of the inclined outer periphery 14b2. That is, the valve head cavity S1 is a generally truncated circular cone shape cavity with its ceiling 14b1 offset upward by the distance H. The magnitude of the offset distance H amounts to a predetermined depth to be machined in the bottom 14b' of the semi-spherical recess of the valve head shell 14a to form a flat face 14b1 perpendicularly to the axis L of the valve 10, as described in detail later, after the valve shell 14a is formed in the process of forging the shell 11 (FIG. 5(a)).

In this way, in place of a conventional smooth interconnect region as disclosed in the prior art references 1 and 2, an eave-shape annular step 15 (as viewed from the valve head cavity S1) is provided in the interconnect region P between the valve head cavity S1 and the valve stem cavity S2. A face 14b1 of the annular step 15 facing the valve head cavity S1 is flat and perpendicular to the axis L of the hollow poppet valve 10. In other words, the eave-shape annular step 15 is defined by the inner periphery of the valve stem cavity S1 and the annular peripheral region 14b1 round one open end of the valve stem cavity S1 (or the circular bottom of the generally truncated circular cone shape recess 14b of the valve head shell 14a).

Consequently, tumble flows of coolant 19 are generated in the valve head cavity S1 as indicated by sequences of arrows F1→F2→F3 and F6→F8 shown in FIG. 4(a)-(b), and at the same time a turbulent flow F4→F5→F7 is generated in the valve stem cavity S2 during an opening/closing motion of the hollow poppet valve 10, as described in more detail later. Because of these flows, upper, middle, and lower layers of the coolant in the internal cavity S are actively stirred, which greatly enhances the heat reduction property (or heat transferability) of the hollow poppet valve 10.

In this embodiment particular, since the circular ceiling 14b1 (or the circular bottom of the recess 14b) and the inclined outer periphery 14b2 of the valve head cavity S1 make an obtuse angle, smooth circulatory flows of coolant 19 greatly facilitate generation of flows along the inclined outer periphery 14b2 and along the ceiling 14b1 of the valve head cavity S1 towards the interconnect region P (as shown in FIG. 4(a)-(b) by F2 and F8, respectively). These flows results in active tumble flows of coolant 19 in the valve head cavity S2, which enhances stirring of the coolant 19 in the internal cavity S, thereby significantly improving the heat reduction property (thermal conductivity) of the valve 10.

It is noted that the valve stem cavity S2 formed in the valve stem 12 comprises a cavity S21 having a relatively large inner diameter dl near the end of the valve stem (the cavity S21 hereinafter referred to as stem-end side stem cavity S21), and a cavity S22 having a relatively small inner diameter near the valve head (the cavity S22 hereinafter referred to as valve-head side stem cavity S22). There is provided an annular step 17 in between the stem-end side stem cavity S21 and the valve-head side stem cavity S22. The valve stem cavity S2 is partially filled with coolant 19 to a level above the annular step 17.

As a consequence, due to an inertial force acting on the coolant 19 in the valve stem cavity S2 during a valve opening/closing motion of the valve 10, a turbulent flow is generated in the neighborhood of the annular step 17 as shown by arrows F9 and F10 in FIG. 4(a)-(b), which promotes stirring of the coolant 19 in the valve stem cavity S2. Thus, the heat reduction property of the valve 10 is further improved.

Figure 3:
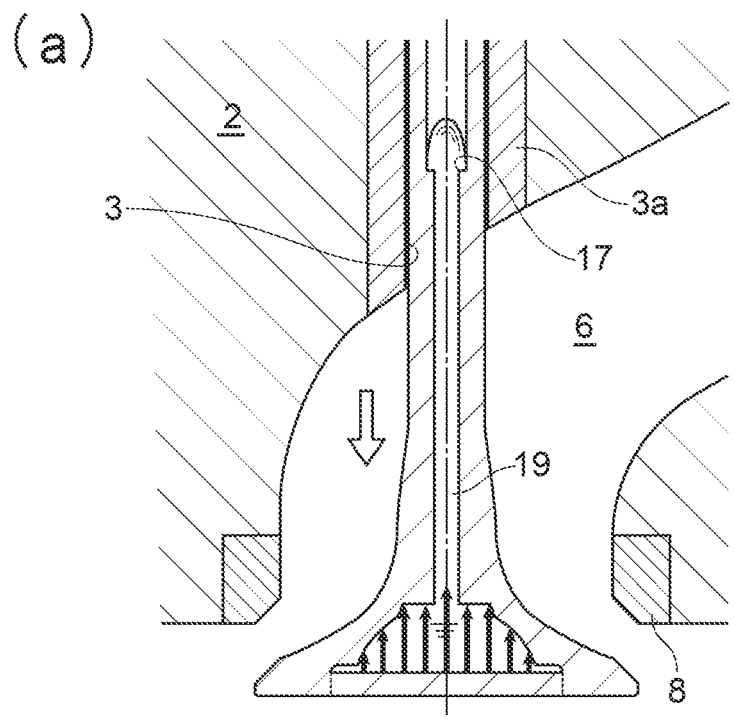
FIG. 3 shows inertial forces that act on the coolant during reciprocal motions of the hollow poppet valve. More particularly.
Figure 3:
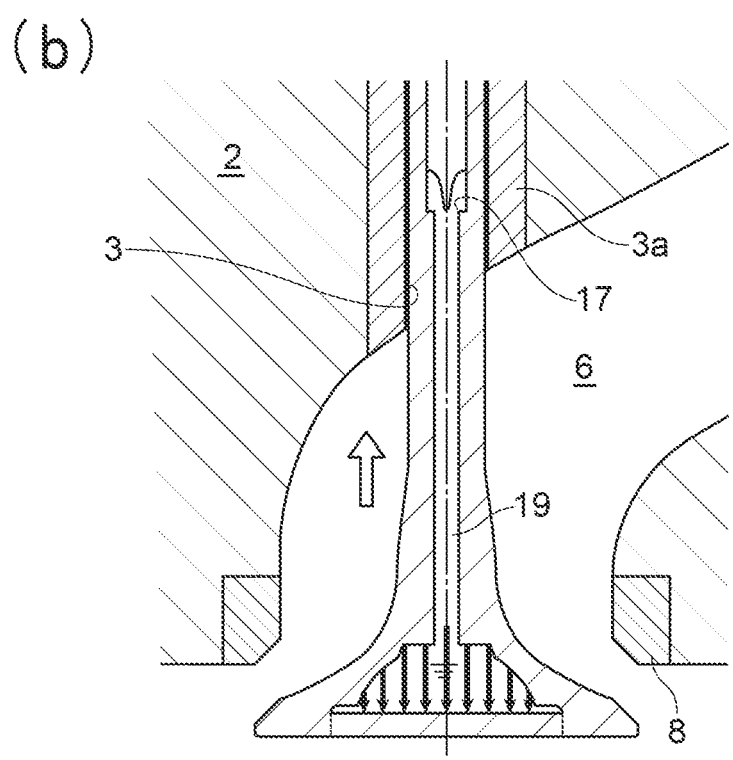
Figure 4:
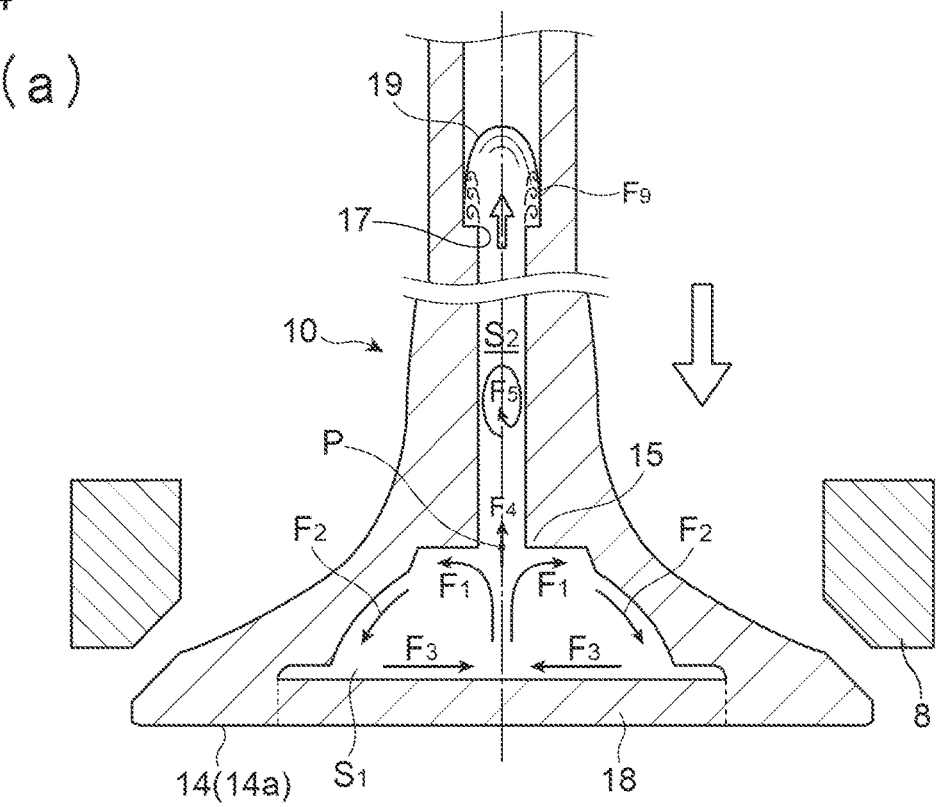
FIG. 4 shows in enlarged scale movements of the coolant during reciprocal motions of the hollow poppet valve. More particularly.
Figure 4:
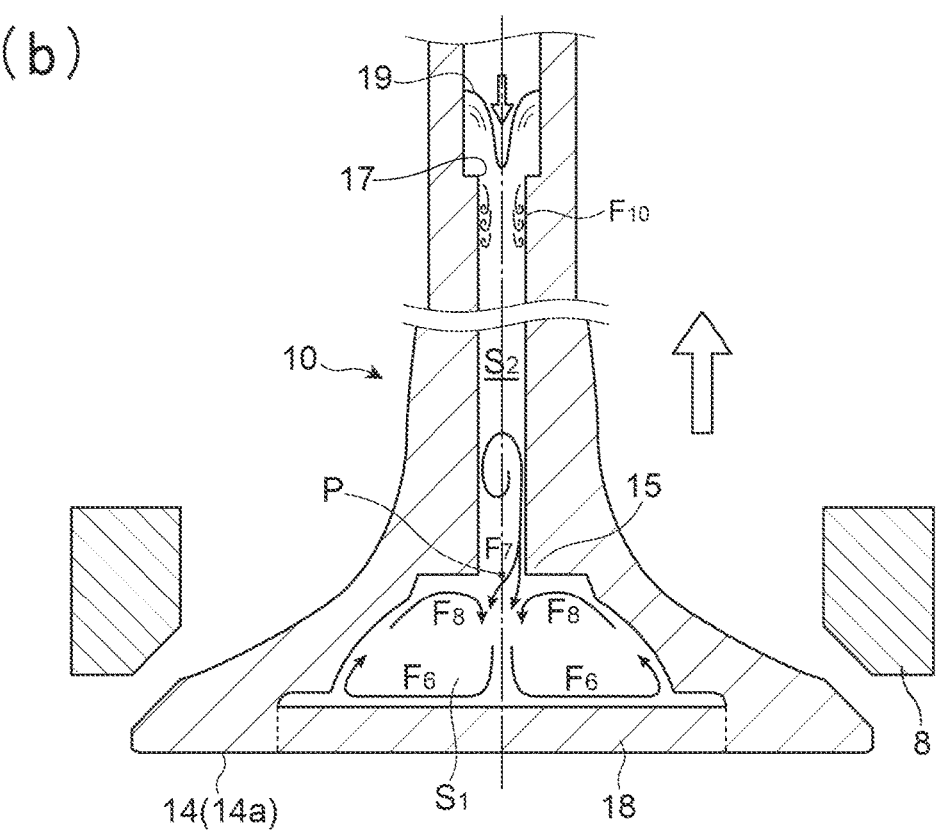

Next, behaviors of the coolant during an opening/closing motion of the hollow poppet valve 10 will now be described in detail with reference to FIGS. 3 and 4.

When the closed hollow poppet valve 10 is moved in a downward valve opening motion as shown in FIG. 3(a), the coolant 19 in the internal cavity S is subjected to an upward inertial force. Since the upward force acting on the coolant 19 in a central region of the valve head cavity S1 than in peripheral regions, the coolant 19 tends to flow into the valve stem cavity S2 across the interconnect region P. However, because of the annular step 15 formed in the interconnect region P, the coolant cannot smoothly move into the valve stem cavity S2 as in a conventional valve disclosed in the prior art references.

Consequently, radially outward flows F1 are generated along the annular step 15 (or the ceiling 14b1 of the valve head cavity S1), although minor flows F4 and F5 of coolant are also generated through the interconnect region P and into the valve stem cavity S2. Under this condition, as the coolant in central regions of the valve head cavity S1 is moved upward, the pressure in the central region of the valve head cavity S1 becomes negative near the bottom of the valve head cavity S1, so that radially inward flows F3 are generated, which accompany downward flows F2 along the inclined outer periphery 14b2 of the valve head cavity S1.

In this way, outer perimetric tumble flows of coolant 19 are generated in the valve head cavity S1 along the axis L of the valve 10 as indicated by a sequence of arrows F1→F2→F3→F4, and so are turbulent flows in the valve stem cavity S2 as shown by arrows F4 and F5.

Further, when a upward valve closing motion of the valve 10 is changed to an downward valve opening motion, the coolant 19 in the valve stem cavity S2 is subjected to an upward inertial force, which causes the coolant to be moved upward in the valve stem cavity S2. which generates turbulent flows F9 downstream of the step 17 as shown in FIG. 4(a) as the coolant 19 moves from the valve-head side stem cavity S22 into the stem-end side stem cavity S21.

On the other hand, when a downward valve opening motion is changed to an upward valve closing motion, the coolant 19 in the internal cavity S is subjected to a downward inertial force as shown in FIG. 3(b). In this case, since the downward inertial force acting on coolant 19 in a central region of valve head cavity S1 is larger than that acting in a peripheral region, the coolant 19 in the central region gives rise to a downward flow F6 towards the center of the bottom of the cavity S1 as shown in FIG. 4(b). At the same time, a downward turbulent flow F7 is generated, across the interconnect region P, in the valve stem cavity S2. The flows F6 along the bottom of the cavity S1 are re-directed by the inclined outer periphery 14b2 of the valve head cavity S1 towards the ceiling 14b1 of the cavity S1 and turn out to be flows F8 along the ceiling 14b1, which finally merge into the central downward flows F6 and F7 in the valve head cavity S1.

In other words, inner perimetric tumble flows of the coolant 19 are generated indicated by a sequence of arrows F6→F8→F6, which run along the axis L of the valve 10 in the valve head cavity S1, while a turbulent flow F7 is generated in the valve stem cavity S2.

Furthermore, as downward valve opening motion of the valve 10 is changed to an upward valve closing motion, the coolant that has moved to an upward region of the valve stem cavity S2 is now urged by a downward inertial force, so that the coolant is moved downward in the valve stem cavity S2, from the valve stem cavity S21 towards the valve-head side stem cavity S22 across the step 17, giving rise to turbulence F10 downstream of the step 17.

Thus, during a valve opening/closing motion, tumble flows F1→F2→F3 and F6→F8 and/or turbulent flows F4, F5, F7, F9, and F10 may take place in the internal cavity S, facilitating significant stirring of upper, middle, and lower levels of the coolant, and thereby greatly improving the heat reduction property of the valve 10.

By providing the annular step 17 at an axial position of the internal cavity S that corresponds to a substantial end 3b of a valve guide 3 facing the exhaust port 6 as shown in FIG. 1, and by forming the diametrically larger stem-end side stem cavity S21 sufficiently long so as to increase the area of the valve stem 12 in contact with the coolant 19, the heat transfer efficiency of the valve stem 12 is increased, and the thickness of the cavity wall, and hence the weight of the valve 10, is reduce without loosing the durability of the valve 10. In other words, the annular step 17 is provided at a predetermined position in the valve stem cavity S never entering the exhaust port 6 if the valve is fully opened to its lowest position 17x shown by a phantom line in FIG. 1, (that is, the step 17 is located at a predetermined position where the thinner valve-stem end side stem cavity S21 is hardly affected thermally in the exhaust port 6).

Described in more detail, since fatigue strength of a metal decreases at high temperatures, it is necessary to make the thickness of the wall of the valve stem 12 near the valve head 14 larger, since the portion is exposed to high temperatures in the exhaust port 6. On the other hand, the portion of the valve stem 12 closer to the valve stem end (hereinafter referred to as stem-end side valve stem) is not only remote from the combustion chamber and less subjected to the heat transmitted from the combustion chamber 4 and exhaust port 6, but also kept in contact with the valve guide 3a via the coolant 19 so as to dissipate its thermal energy to the cylinder head 2 via the valve guide 3a. Thus, the stem-end side valve stem is not so much heated to a high temperature as the portion of the valve stem close to the valve head 14.

That is, since the stem-end side valve stem is less likely to loose its fatigue strength than a valve-head side valve stem (defined to be a portion of the valve stem close to the valve head 14), there will be no durability problem (of fatigue failure for example) if the inner diameter of the stem-end-side stem cavity S21 is increased (that is, if the thickness of the wall of the stem-end side stem is reduced).

In this embodiment, therefore, firstly, the entire surface area of the valve stem cavity S2 in contact with the coolant is increased to enhance the heat transfer efficiency of the valve stem 12 by enlarging the inner diameter of the stem-end-side stem cavity S21. Secondly, the total weight of the valve 10 is reduced by increasing the total volume of the valve stem cavity S2.

Since the stem member 12b is not required to have a high heat resistance as compared with the shell 11, the stem member 12b may be made of a less heat resisting inexpensive material.

Figure 5:
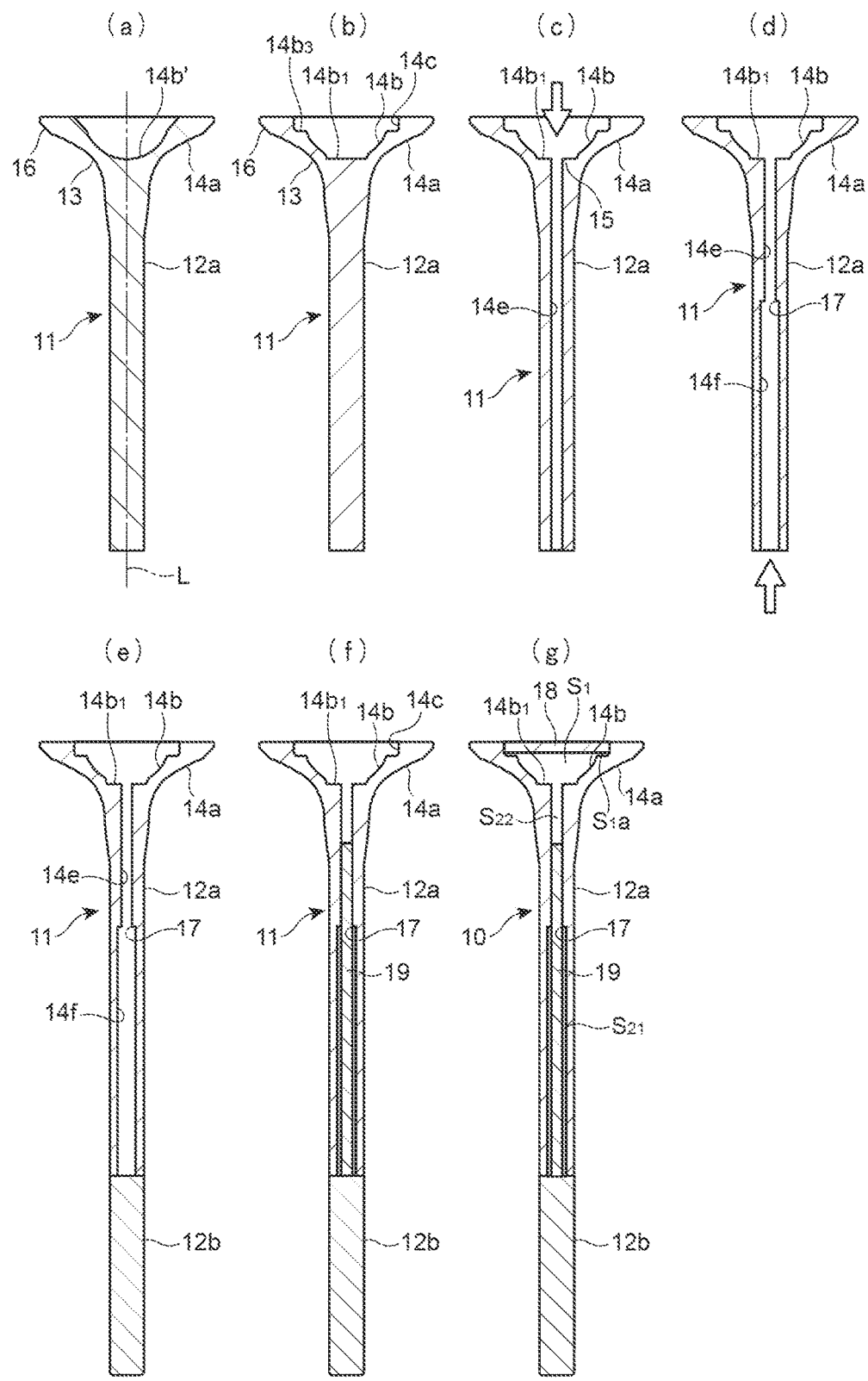
FIG. 5 shows steps of manufacturing a hollow poppet valve. More particularly.

Next, referring to FIG. 5, a process of manufacturing a hollow poppet valve 10 will now be described in detail.

Firstly, a shell 11 is formed, by hot forging, to have a valve head shell 14a integral with a stem 12a such that the valve head shell 14a has a semi-spherical, yet generally truncated circular corn shape, recess 14b' as shown in FIG. 5(a). It is noted that, the semi-spherical recess 14b' is formed in the process of forming the shell 11 (valve head shell 14a). This semi-spherical recess 14b' is a prototype of a generally truncated circular cone shape recess to be formed later for a valve head cavity having a stepped ceiling.

The hot forging may be an extrusion forging in which a heat resisting steel alloy block is repetitively extruded from different metallic dies to form a shell 11, or an upset forging in which a heat resisting steel alloy bar is first upset by an upsetter to form at one end thereof a semi-spherical section, which is then forged with a forging die to form the shell 11 (of a valve head shell 14a). In this hot forging, a curved fillet 13 is formed between the valve head shell 14a and the stem 12a, and a tapered valve seat 16 is formed on the outer periphery of the valve head shell 14a.

Next, as shown in FIG. 5(b), the valve head shell 14a is provided at an open end of the recess 14b' thereof with an inner periphery 14c adapted to engage with a cap. The manufacture process further includes:
a step of forming an annular step 14b3 which serves as a ceiling of the flange shape cavity S1a by machining the valve head cavity S1; and a step of forming a circular flat ceiling 14b1 of the valve head cavity S1 perpendicularly to the axis L of the valve 10 by machining the bottom of the semi-spherical recess 14b' of the valve head shell 14a to a predetermined depth H.

In the next drilling step, the shell 11 is set up with its recess 14b of the valve head shell 14a oriented upward as shown in FIG. 5(c), and a bore 14e is drilled in the stem 12 across the bottom surface 14b1 of the recess 14b of the valve head shell 14a to form a valve-head side stem cavity S22. In this drilling step, the recess 14b of the valve head shell 14a (to serve as the valve head cavity S1) is communicated with the hole 14e to provide the valve-head side stem cavity S2 such that an eave shape annular step 15 (as viewed from the recess 14b) is formed in a region interconnecting the recess 14b and the hole 14e.

In the next boring step, the shell 11 is drilled from the stem end to form a hole 14f that corresponds to the stem end side stem cavity S21 and a step 17 in the stem cavity S2, as shown in FIG. 5(d).

Next, a stem member 12b is welded to the stem end of the shell 11, as shown in FIG. 5(d) (stem member welding step).

In the next coolant depositing step, a predetermined amount of solidified coolant 19 is filled in the hole 14e of the valve head shell 14a of the shell 11 as shown in FIG. 5(e).

Finally, in a cavity closing step, a cap 18 is welded by resistance welding for example in the argon atmosphere onto the inner periphery 14c of the recess 14b of the valve head shell 14a of the shell 11 as shown in FIG. 5(g). Thus, the internal cavity S of the valve 10 is sealed with the cap 18. At the same time, a flange shape cavity S1a is formed in the bottom of the valve head cavity S1. Alternatively, the cap may be welded by electron beam welding or by laser beam welding.

Thus, the flat ceiling 14b1 of the valve head cavity S1 is provided at a position offset from the top end (ceiling 14b'1) towards the stem by a predetermined distance H, where the top end (ceiling 14b'1) is defined by the slightly curved and inclined skirt-shape periphery 14b2. This structural feature of the valve 10 provides the following merits.

Firstly, in the foregoing step shown in FIG. 5(a), use can be made of a die that has a wear-resisting semi-spherical bulging tip. Secondly, precision requirements of the pressing face of the die are eased. As a result, fabrication of the die is eased, since the circular ceiling 14b1 of the valve head cavity S1 can be formed by machining subsequent to the forging step. In addition, accuracy of the circular ceiling 14b1 of the valve head cavity S1 is increased by machining.

Consequently, not only a certain fabrication accuracy of the valve head cavity S1 is secured, but also uniformity in heat reduction property of the resultant valves 10 can be secured.

Figure 6:
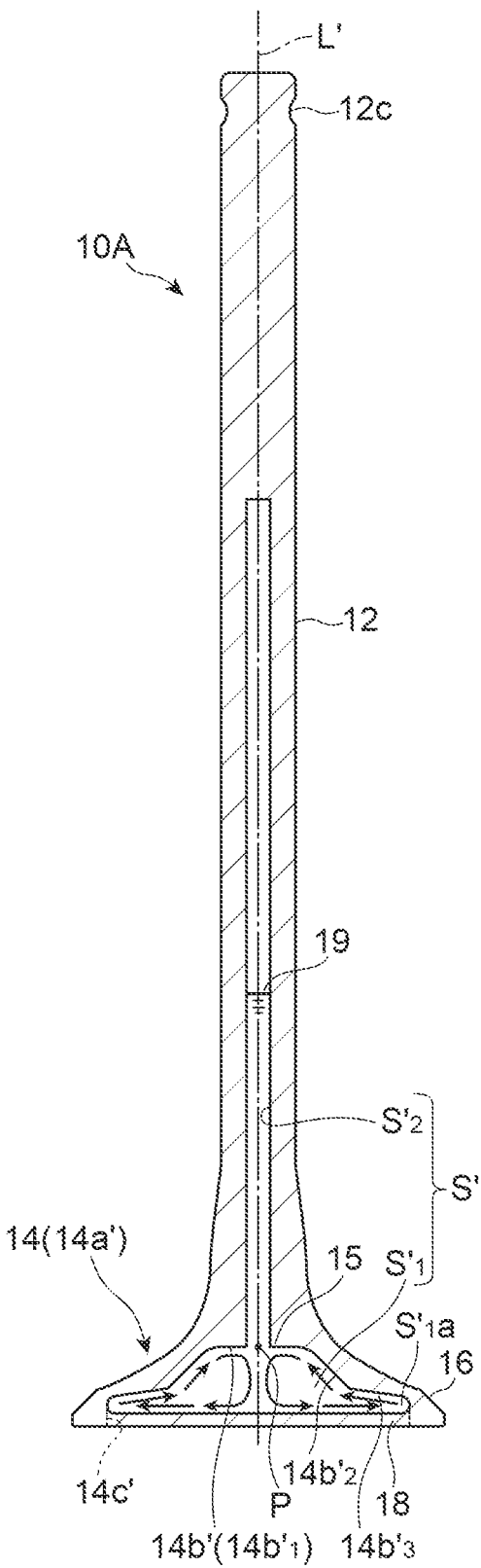
FIG. 6 is a longitudinal cross section of a hollow poppet valve in accordance with a second embodiment of the invention.

FIG. 6 shows a longitudinal cross section of a hollow poppet valve in accordance with a second embodiment of the invention.

It is recalled that the hollow poppet valve 10 of the first embodiment is provided in the valve head 14 with a valve head cavity S1 which is formed with a generally truncated circular cone shape cavity. In contrast, the hollow poppet valve 10A of the second embodiment is provided in the valve head 14 with a valve head cavity S'1 which is formed with a generally truncated circular cone shape cavity having a tapered periphery 14b'2.

It is noted that the valve head cavity S'1 is provided at the bottom thereof with a flange shape cavity S'1a, which is larger in radius than that of the flange shape cavity S1a of the valve 10, so that the length of heat transfer path of the valve 10A in the valve material between the valve seat 16 and (the coolant in) the valve head cavity S'1 is further reduced for a better heat transfer efficiency, so that the heat transfer efficiency of the valve head 14 is greater than that of the valve 10 described in the first embodiment.

Still further, a shell 11' has a valve head shell 14a' formed with a recess 14b', whose the internal periphery 14c' formed at its open end is larger in radius than the corresponding inner periphery 14c of the first embodiment. but also an annular step 14b'3 serving as a ceiling of the flange shape cavity S'1a is tapered so as to allow the coolant in the valve head cavity S1' to give rise to a tumble flow and allow the tumble flow to be partly lead into the flange shape cavity S'1a during a valve opening/close motion of the valve 10A, as shown by arrows in FIG. 6, thereby further enhancing the heat reduction property (heat transferability) of the valve than the valve 10.

Furthermore, in contrast to the valve 10 of embodiment 1 where a valve stem cavity S2 formed in the valve stem 12 consists of a diametrically smaller valve-head side stem cavity S21 and a diametrically larger stem end side stem cavity S21, the internal cavity S2 formed in the valve stem 12 of the hollow poppet valve 10A has a constant inner diameter throughout its axial length.

Other features of the second embodiment are the same as those of the first embodiment, so that like or same elements are simply referred to by the same symbols in these embodiments to avoid redundant descriptions.

Figure 7:
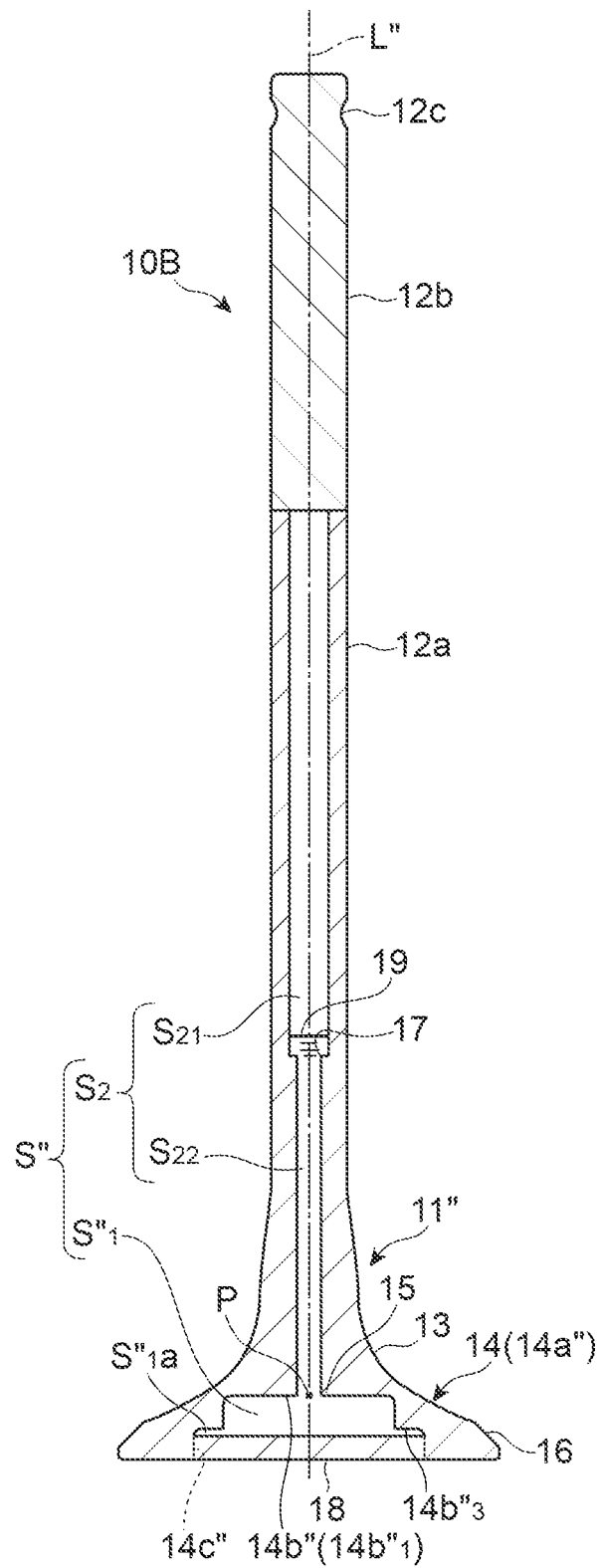
FIG. 7 is a longitudinal cross section of a hollow poppet valve in accordance with a third embodiment of the invention.

FIG. 7 is a longitudinal cross section of a hollow poppet valve in accordance with a third embodiment of the invention.

In contrast to the hollow poppet valves 10 and 10A of the foregoing embodiments where each of the valve head cavities S1 and S'1 formed in the respective valve heads 14 is provided in the form of a generally truncated circular cone shape cavity having a circular step ceiling, a hollow poppet valve 10B of the third embodiment is provided with a valve head cavity S"1 in the shape of a low right cylinder (or a disk)

This poppet valve 10B has a shell 11" which comprises a valve head shell 14a" formed with a cylindrical recess 14b". Formed at an open end of the recess 14b" are an annular step 14b"3 and an inner periphery 14c" adapted to engage with a cap 18. The internal cavity S" is sealed by welding the cap 18 onto the inner periphery 14c' after a coolant 19 such as metallic sodium is deposited therein together with an inert gas such as Argon.

Provided on the bottom of the valve head cavity S"1 is a flange shape cavity S"1, which is similar in shape and function to the flange shape cavity S1a of the valve 10.

Other features of the third embodiment are the same as those of the first embodiment, so that like or same elements are simply referred to by the same reference symbols, avoiding redundant descriptions of such elements.

It is recalled that each of the valves 10, 10A, and 10B of the foregoing embodiments is charged with a coolant 19 and an inert gas in the internal cavity of the valve such that tumble flows of coolant are generated along the axis of the valve during a reciprocal motion of the valve to facilitate positive stirring of the coolant. It should be understood, however, that the invention can be also applied to those hollow poppet valves that exhibit little tumble flows due to the fact that they contain an excessive amount of the coolant in the internal cavities.

BRIEF DESCRIPTION OF THE DRAWINGS 10, 10A, and 10B hollow poppet valves
11, 11', and 11" shell for a valve head shell integral with a stem
12 valve stem
12a stem
12b stem member
14 valve head
14a, 14a', 14a" valve head shells
14b, 14b', and 14b" recesses formed in valve head shells
14b1, 14b'1, and 14b"1 circular ceilings of valve head cavities
14b2, 14b2' inclined peripheries of valve head cavities
14c, 14c', and 14c" inner peripheries of recesses near open ends, formed in valve head shells
15 eave shape annular step, formed in the ceiling of valve head cavity to surround open end of stem cavity
17 annular step formed in stem cavity
18 cap
19 coolant
L, L', and L" axes of valves
S, S', and S" internal cavities
S1, S', and S"1 valve head cavities
S2, S'2, and S"2 valve stem cavities
P interconnect region
S21 stem-end side stem cavity
S22 valve-head side stem cavity
F1→F2→F3; F6→F8 tumble flows
F4, F5, and F7 turbulent flows
F9 and F10 turbulent flows

The invention claimed is:

1. A hollow poppet valve the poppet valve comprising:
a valve head and a valve stem integral at one end thereof with the valve head, the poppet valve formed with an internal cavity that extends from within the valve head into the valve stem and is charged with a coolant together with an inert gas,
wherein the internal cavity has a diametrically large generally disk shaped cavity in the valve head and a diametrically small linear straight cavity in the valve stem in communication with the valve head cavity,
wherein only a bottom fringe portion of the valve head cavity is extended radially outwardly and circumferentially, forming a flange shape cavity at the bottom fringe portion of the valve head cavity, the flange shape cavity communicating with the valve head cavity,
wherein the valve head cavity is configured in the shape of a generally truncated circular cone whose longitudinal cross section is a substantial trapezoid and whose periphery is either an excurved skirt-like outer periphery or a tapered periphery parallel with the outer periphery of the valve head,
wherein a peripheral region of the valve head cavity around an open end of the valve stem cavity communicated with the valve head cavity is a flat plane perpendicular to the axis of the valve, and, serves as a ceiling of the valve head cavity,
wherein the coolant is charged in the valve head cavity and the valve stem cavity, and wherein a vertical circulatory flow of coolant is generated in the coolant in the valve head cavity along the axis of the valve while a turbulent flow of coolant is generated in the coolant in the valve stem cavity, during a reciprocal motion of the valve.

2. The hollow poppet valve according to claim 1,
wherein a ceiling of the flange shape cavity is tapered so as to allow a part of the circulatory flows of coolant to be led into the flange shape cavity.

3. The hollow poppet valve according to claim 1,
wherein the valve head cavity has a stepped configuration in which the peripheral region around the open end of the valve head cavity is offset from a top end of the generally truncated circular cone by a predetermined distance towards the valve stem.

4. The hollow poppet valve according to claim 1,
wherein the valve stem cavity has a diametrically larger cavity in a stem end side of the valve stem and a diametrically smaller cavity in a valve head side of the valve stem;
wherein an annular step is provided at a predetermined axial position of the valve stem cavity; and
wherein the coolant is charged to a level exceeding the annular step, and
wherein the turbulent flow of coolant is generated in a downstream side of the annular step during the reciprocal motion of the valve.

5. The hollow poppet valve according to claim 4,
wherein the annular step in the valve stem cavity is located at an axial position not within an exhaust/intake port when the valve is installed in the exhaust/intake port of the engine.

6. The hollow poppet valve according to claim 2,
wherein the valve head cavity has a stepped configuration in which the peripheral region around the open end of the valve head cavity is offset from a top end of the generally truncated circular cone by a predetermined distance towards the valve stem.

7. The hollow poppet valve according to claim 2,
wherein the valve stem cavity has a diametrically larger cavity in a stem end side of the valve stem and a diametrically smaller cavity in a valve head side of the valve stem,
wherein an annular step is provided at a predetermined axial position of the valve stem cavity,
wherein the coolant is charged to a level exceeding the annular step, and
wherein the turbulent flow of coolant is generated in a downstream side of the annular step during the reciprocal motion of the valve.

8. The hollow poppet valve according to claim 3,
wherein the valve stem cavity has a diametrically larger cavity in a stem end side of the valve stem and a diametrically smaller cavity in a valve head side of the valve stem,
wherein an annular step is provided at a predetermined axial position of the valve stem cavity,
wherein the coolant is charged to a level exceeding the annular step, and
wherein the turbulent flow of coolant is generated in a downstream side of the annular step during the reciprocal motion of the valve.

9. The hollow poppet valve according to claim 6,
wherein the valve stem cavity has a diametrically larger cavity in a stem end side of the valve stem and a diametrically smaller cavity in a valve head side of the valve stem,
wherein an annular step is provided at a predetermined axial position of the valve stem cavity,
wherein the coolant is charged to a level exceeding the annular step, and
wherein the turbulent flow of coolant is generated in a downstream side of the annular step during the reciprocal motion of the valve.

* * * * *